(12) United States Patent
Mallick et al.

(10) Patent No.: US 9,142,054 B2
(45) Date of Patent: Sep. 22, 2015

(54) SYSTEM AND METHOD FOR CHANGING HAIR COLOR IN DIGITAL IMAGES

(71) Applicants: Satya P. Mallick, San Diego, CA (US); Hui Qiao, San Diego, CA (US); David Kriegman, San Diego, CA (US)

(72) Inventors: Satya P. Mallick, San Diego, CA (US); Hui Qiao, San Diego, CA (US); David Kriegman, San Diego, CA (US)

(73) Assignee: TAAZ, INC., La Jolla, CA (US)

( * ) Notice: Subject to any disclaimer, the term of this patent is extended or adjusted under 35 U.S.C. 154(b) by 0 days.

(21) Appl. No.: 14/526,896

(22) Filed: Dec. 17, 2014

(65) Prior Publication Data

US 2015/0091938 A1    Apr. 2, 2015

Related U.S. Application Data

(63) Continuation of application No. 12/889,533, filed on Sep. 24, 2010, now Pat. No. 8,884,980.

(51) Int. Cl.
| | |
|---|---|
| *G09G 5/02* | (2006.01) |
| *G06T 11/60* | (2006.01) |
| *G06T 11/00* | (2006.01) |
| *A45D 44/00* | (2006.01) |
| *G06K 9/00* | (2006.01) |
| *G06K 9/38* | (2006.01) |

(52) U.S. Cl.
CPC .............. *G06T 11/60* (2013.01); *A45D 44/005* (2013.01); *G06K 9/00234* (2013.01); *G06K 9/38* (2013.01); *G06T 11/001* (2013.01); *G06T 2207/10024* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 8,884,980 B2* | 11/2014 | Mallick et al. ................ | 345/594 |
| 2003/0215133 A1* | 11/2003 | Gindele et al. ................ | 382/167 |
| 2004/0156544 A1* | 8/2004 | Kajihara ........................ | 382/167 |
| 2008/0089581 A1* | 4/2008 | Pitie et al. ..................... | 382/162 |
| 2010/0328335 A1* | 12/2010 | Hanechak et al. ............ | 345/589 |
| 2011/0293188 A1* | 12/2011 | Zhang et al. .................. | 382/190 |
| 2012/0020553 A1* | 1/2012 | Pettigrew et al. ............. | 382/164 |

OTHER PUBLICATIONS

"Color Transforms for Creative Image Editing", by Pavel Kisilev and Daniel Freedman, Color and Imaging Conference, vol. 2009, No. 1, 2009, pp. 284-289(6).*

(Continued)

*Primary Examiner* — James A Thompson
(74) *Attorney, Agent, or Firm* — Cotman IP Law Group, PLC

(57) ABSTRACT

A system and method for digital hair coloring is described. A starting image of a subject including a hair region is obtained. At least one foreground selection of the starting image is obtained, the foreground selection including a portion of the hair region. At least one background selection of the starting image excluding the hair region is obtained. A matte defining a calculated foreground area of the starting image is calculated based on the foreground selection and the background selection. A target color distribution based on a target hair color is obtained. A color image is generated by applying a color transformation based on the target color distribution to at least the calculated foreground area of the starting image. An output image is generated from the colored image and the starting image.

15 Claims, 10 Drawing Sheets

(56) References Cited

OTHER PUBLICATIONS

"Frequential and color analysis for hair mask segmentation", by C. Rousset and P. Y. Coulon, 15th IEEE International Conference on Image Processing, 2008, Oct. 12-15, 2008, pp. 2276-2279.*

"Object-Based Image Recoloring Using Alpha Matte and Color Histogram Specification", by Xuezhong Xiao, Lizhuang Ma, and Marco Kunze, Interactive Technologies and Sociotechnical Systems Lecture Notes in Computer Science, vol. 4270, 2006, pp. 194-203.*

* cited by examiner

US 9,142,054 B2

SYSTEM AND METHOD FOR CHANGING HAIR COLOR IN DIGITAL IMAGES

CROSS-REFERENCE TO RELATED APPLICATIONS

The present application is a Continuation of U.S. patent application Ser. No. 12/889,533, filed on Sep. 24, 2010, specification of which is herein incorporated by reference for completeness of disclosure.

BACKGROUND OF THE INVENTION

1. Field of the Invention

Embodiments of the invention described herein pertain to the field of computer systems. More particularly, but not by way of limitation, one or more embodiments of the invention enable a system and method for changing hair color in digital images.

2. Description of the Related Art

Digital photography and image processing techniques have become more accessible to the general population due to advances in digital and computer technologies. Digital image modification is an increasingly common technique for producing image material for professional, recreational and promotional purposes.

Image and video matting techniques are used to determine the foreground of an image or video to extract a relevant portion of an image. Image matting algorithms can be used to create composite images and videos. Matting may also be used as an intermediate step, such as to apply other image editing or processing techniques to a foreground portion of an image or a background portion of the image.

Basic image matting techniques have been used to provide images to change the hairstyle of a subject in an image, including the subject's hair color. These basic techniques use matting and compositing to provide a preview image of a hair treatment, such as a hair color product.

When the preview image shows a change in hair color, a single selected color is typically used. For example, hair color is changed in a preview image by overlaying a semitransparent mask of the single selected color over a hair region of an image. The quality of these preview images is limited because the method using the single selected color does not produce a realistic simulation of real hair color in a photographic image.

To overcome the problems and limitations described above there is a need for systems and methods for digital hair coloring which realistically simulate hair color distribution in a photographic image.

BRIEF SUMMARY OF THE INVENTION

Systems and methods are provided for digital hair coloring. A color transformation is applied to a starting image of a subject to modify the color of a hair region of the starting image. The color transformation is based on a target color distribution. The target color distribution may be selected based on a target hair color. A more realistic output image of the subject with the target hair color is produced using these systems and methods as compared with images generated using a target color alone.

In one or more embodiments, the target color distribution is based on at least one photographic image of hair representative of the target hair color. A target color distribution may be extracted from a sample photographic image. A target color distribution associated with a target hair color may also be extracted from multiple photographic images that are all representative of the one target hair color.

As used herein, the term "image" refers to any digital representation of one or more images, including a digital representation of video information.

As used herein, the term "color space" refers to any color model or a combination of a specific color model and a mapping function.

As used herein, the term "color distribution" refers to any mathematical description of the color composition of a set of pixels of an image, including an image region or an entire image. In one or more embodiments, a color distribution is a probability distribution of pixel values.

As used herein, the term "photographic image" refers to any image of a three-dimensional object captured using a digital or non-digital imaging device.

As used herein, the term "digital image" refers to any digital representation of an image originally captured with either a digital or non-digital imaging device.

One or more embodiments described in this disclosure are directed to a computer-implemented method for digital hair coloring. A starting image of a subject that includes a hair region of the subject is obtained. The starting image may be obtained through a user interface configured to allow a user to select a starting image.

A matte defining a calculated foreground area of the starting image is calculated. The matte may be an alpha mask for the starting image. The alpha mask includes alpha values in a range from a background alpha value to a foreground alpha value. An alpha value equal to the background alpha value indicates that a corresponding pixel is a background pixel. An alpha value equal to the foreground alpha value indicates that a corresponding pixel is a foreground pixel. An alpha value between the background alpha value and the foreground alpha value indicates that the pixel is a mixture of the foreground color and background color with the value of alpha indicating the proportion.

In one or more embodiments, the matte is calculated based on at least one foreground selection and at least one background selection. At least one foreground selection of the starting image is obtained. The foreground selection includes a portion of the hair region. At least one background selection of the starting image that excludes the hair region is obtained. The at least one foreground selection and the at least one background selection may be obtained by image processing. The at least one foreground selection and the at least one background selection may also be obtained through a user interface configured to allow a user to select at least one foreground selection and at least one background selection.

In one or more embodiments, the matte is calculated based on a bounding box, a skin region, and one or more foreground points. A bounding box around said hair region of said starting image is obtained. A skin region of said starting image is detected. One or more foreground points within said hair region of said starting image are obtained.

A target color distribution based on a target hair color is obtained. The target color distribution may be based on an obtained target hair color, such as a target hair color selected through a user interface configured to allow a user to select a target hair color. The target color distribution may also be obtained by extracting the target color distribution from a photographic image of hair representative of the target hair color. The photographic image of hair representative of the target hair color may be obtained through a user interface configured to allow a user to select the photographic image of the hair from which the target color distribution is extracted.

A hair color product associated with the target hair color may be displayed, including a product image, product name, product brand, product color, or any other product information. The output image may represent a simulation of the hair color product on the subject. At least one characteristic capable of affecting the result of the hair color product may be obtained, such as a hair texture, an ethnicity, a starting hair color, or any other characteristic capable of affecting the result of a hair color product on a subject. At least one of the target color distribution and the color transformation may be modified based on the at least one characteristic. The at least one characteristic may be obtained by extracting one or more characteristics from the starting image.

When a hair coloring product is applied to a person's hair, the resulting color depends upon the starting color as well as other characteristics of that person's hair. In one or more embodiments, the target color distribution is further based on at least one hair characteristic selected from a starting hair color, a hair grayness, a hair damage level, a hair texture, a hair thickness, an ethnicity hair type, and any other characteristic describing a person's hair.

A color image is generated by applying a color transformation based on the target color distribution to at least the calculated foreground area of the starting image. An output image is generated from the colored image and the starting image.

The colored image may be generated by applying the color transformation to the calculated foreground area of the starting image indicated by the matte. The colored image may also be generated by applying the color transformation to substantially all of the starting image to generate the colored image, where generating the output image is performed by combining a foreground area of the colored image with the background area of the starting image using the matte. In one or more embodiments, alpha values from an alpha mask are used to generate the output image, where each alpha value determines a colored image contribution to the output image at the corresponding pixel.

In one or more embodiments, generating the colored image includes applying the color transformation to the calculated foreground area, where generating said output image comprises combining said calculated foreground area after applying the color transformation and a calculated background area. In one or more embodiments, generating the colored image includes applying the color transformation to the starting image, where generating the output image includes combining the starting image after applying the color transformation and a calculated background area.

The target color distribution may include three histograms corresponding to three color channels of a selected color space, such as RGB, CIE Lab, HSV, YIQ, YUV, YCbCr, CMYK, CIE XYZ, HSI, or any other color space. The target color distribution may also include n histograms corresponding to n channels of a selected color space. When the target color distribution is based on histograms corresponding to color channels, the output image may be generated by applying a nonlinear transformation, such as histogram matching applied to one or more color channels, to the starting image to map a starting color distribution of the starting image to the target color distribution, where the color transformation is independent of pixel location.

The target color distribution may be modeled as a multivariate normal distribution in the selected color space with a mean color vector and a covariance matrix. Target principal axes of the target color distribution may be estimated using principal component analysis. Generating the output image based on a color distribution as described may include transforming starting principal axes of color distribution of the starting image to the target principal axes of the target color distribution, such as by using an affine transformation. For example, the affine transformation may be a rotation, scaling and translation of colors. It may be desirable to fix the black point so that when the transformation is applied to a black pixel, the resulting color remains black. In this case, the affine transform reduces to a linear transform.

One or more embodiments described in this disclosure are directed to a computer-readable medium for digitally coloring hair. The computer-readable medium is encoded with computer-executable instructions that when executed by a processor of a computer performs a series of steps. The steps include obtaining a starting image of a subject. The starting image includes a hair region.

The steps encoded further include obtaining at least one foreground selection of the starting image. The at least one foreground selection includes a portion of the hair region. The steps further include obtaining at least one background selection of the starting image. The at least one background selection excludes the hair region. The at least one foreground selection and the at least one background selection may be obtained by image processing. The at least one foreground selection and the at least one background selection may also be obtained through a user interface configured to allow a user to select the at least one foreground selection and the at least one background selection.

The steps encoded further include calculating a matte defining a calculated foreground area based on the at least one foreground selection and the at least one background selection. Calculating the matte may include calculating an alpha mask for the starting image. The alpha mask includes alpha values in a range from a background alpha value to a foreground alpha value. An alpha value equal to the background alpha value indicates that a corresponding pixel is a background pixel. An alpha value equal to the foreground alpha value indicates that a corresponding pixel is a foreground pixel. An alpha value between the background alpha value and the foreground alpha value indicates a mixture of the background color and foreground color of a pixel.

The steps encoded further include obtaining a target color distribution. The target color distribution is based on a target hair color. The target color distribution may be obtained by extracting the target color distribution from a photographic image of hair representative of the target hair color. The target color distribution may be modified by determining a starting color based on the hair region of the starting image using the matte, and modifying the target color distribution based on the starting color.

The steps encoded further include generating a colored image by applying a color transformation based on the target color distribution to at least the calculated foreground area of the starting image. The steps encoded further include generating an output image from the colored image and the starting image. The steps encoded further include displaying the output image.

The color image may be generated by applying the color transformation to the calculated foreground area of the starting image indicated by the matte. The colored image may also be generated by applying the color transformation to substantially all of the starting image to generate the colored image, where generating the output image is performed by combining a foreground area of the colored image with the background area of the starting image using the matte. In one or more embodiments, alpha values from an alpha mask are used to generate the output image, where each alpha value determines contribution of the colored image and/or the starting image to the output image at the corresponding pixel.

The target color distribution may include three histograms corresponding to three color channels of a selected color space, such as RGB, CIE Lab, HSV and HSI, or any other color space. The target color distribution may also include n histograms corresponding to n channels of a selected color space. When the target color distribution is based on histograms corresponding to color channels, the output image may be generated by applying a nonlinear transformation, such as histogram matching applied to one or more color channels, to the starting image to map a starting color distribution of the starting image to the target color distribution, where the color transformation is independent of pixel location. One of ordinary skill in the art would recognize that other mathematical concepts and data structures equivalent to n histograms corresponding to n color channels of a selected color space may be used without departing from the spirit or the scope of the invention.

A nonlinear transformation from the original image to the target color may be constructed using both principal component analysis and histogram matching. Using principal component analysis on the colors in the hair region of the source image, colors in the source image are transformed to a coordinate system defined by the principal axes of the source distribution. Principal component analysis can also be used to transform colors in the target distribution to a coordinate system defined by the principal axes of the target distribution. The principal axes of the source image are identified with the axes of the target distribution. Histogram matching can then be applied to one or more color channels to establish a transformation to that takes each coordinate of the source color in the principal axes space to the coordinate of the target color in its principal axes space. This transformation is applied to the colors in the source principal axes space. Finally, the colors are transformed from the principal axes space of the target image back to the target color space.

The steps encoded may include providing a user interface configured to allow a user to select the starting image. The user interface may be further configured to select the at least one foreground selection of the starting image and the at least one background selection of the starting image. The user interface may be further configured to select the target hair color. In one or more embodiments, the user interface is further configured to allow a user to select a photographic image showing hair representative of a target hair color. The target color distribution is extracted from the photographic image.

One or more embodiments are directed to a computer-implemented method for custom digital hair styling. The computer-implemented method includes the step of obtaining a photographic image of a subject including a hair region. The computer-implemented method further includes the step of obtaining a selected target color distribution. In one or more embodiments, the selected target color distribution is obtained by extracting a custom target color distribution from the photographic image based on at least the hair region of the photographic image The computer-implemented method further includes the step of obtaining a hairstyle image including a color image and an alpha mask. The computer-implemented method further includes the step of applying a color transformation based on the selected target color distribution to the hairstyle image. The computer-implemented method further includes the step of fitting the hairstyle image to a head of the subject in the starting image. The computer-implemented method further includes the step of generating an output image including the starting image and the hairstyle image based on the alpha mask.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

Systems and methods for digital hair coloring will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
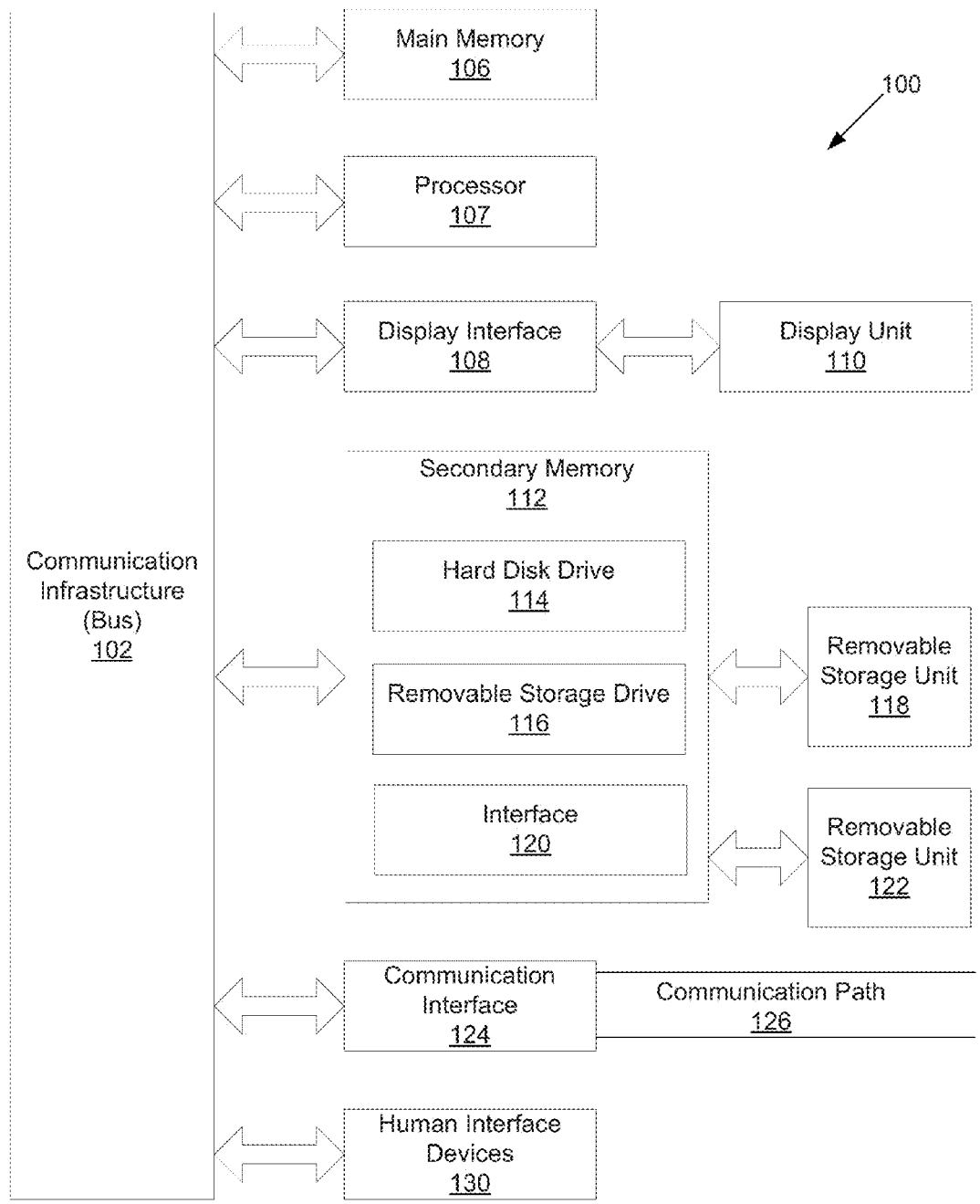
FIG. 1 illustrates a general-purpose computer and peripherals that when programmed as described herein may operate as a specially programmed computer capable of implementing one or more methods, apparatus and/or systems of the solution.

FIG. 1 diagrams a system 100 comprising a general-purpose computer and peripherals, when programmed as described herein, may operate as a specially programmed computer capable of implementing one or more methods, apparatus and/or systems of the solution described in this disclosure. Processor 107 may be coupled to bi-directional communication infrastructure 102 such as communication infrastructure system bus 102. Communication infrastructure 102 may generally be a system bus that provides an interface to the other components in the general-purpose computer system such as processor 107, main memory 106, display interface 108, secondary memory 112 and/or communication interface 124. In one or more embodiments of systems and methods for digital hair coloring, one or more Graphical Processing Units (GPUs) are utilized to accelerate one or more graphic rendering processes.

Main memory 106 may provide a computer readable medium for accessing and executing stored data and applications. Display interface 108 may communicate with display unit 110 that may be utilized to display outputs to the user of the specially-programmed computer system. Display unit 110 may comprise one or more monitors that may visually depict aspects of the computer program to the user. Main memory 106 and display interface 108 may be coupled to communication infrastructure 102, which may serve as the interface point to secondary memory 112 and communication interface 124. Secondary memory 112 may provide additional memory resources beyond main memory 106, and may generally function as a storage location for computer programs to be executed by processor 107. Either fixed or removable computer-readable media may serve as Secondary memory 112. Secondary memory 112 may comprise, for example, hard disk 114 and removable storage drive 116 that may have an associated removable storage unit 118. There may be multiple sources of secondary memory 112 and systems implementing the solutions described in this disclosure may be configured as needed to support the data storage requirements of the user and the methods described herein. Secondary memory 112 may also comprise interface 120 that serves as an interface point to additional storage such as removable storage unit 122. Numerous types of data storage devices may serve as repositories for data utilized by the specially programmed computer system. For example, magnetic, optical or magnetic-optical storage systems, or any other available mass storage technology that provides a repository for digital information may be used.

Communication interface 124 may be coupled to communication infrastructure 102 and may serve as a conduit for data destined for or received from communication path 126. A network interface card (NIC) is an example of the type of device that once coupled to communication infrastructure 102 may provide a mechanism for transporting data to communication path 126. Computer networks such Local Area Networks (LAN), Wide Area Networks (WAN), Wireless networks, optical networks, distributed networks, the Internet or any combination thereof are some examples of the type of communication paths that may be utilized by the specially program computer system. Communication path 126 may comprise any type of telecommunication network or interconnection fabric that can transport data to and from communication interface 124.

To facilitate user interaction with the specially programmed computer system, one or more human interface devices (HID) 130 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to processor 107 to trigger one or more responses from the specially programmed computer are within the scope of the system disclosed herein.

While FIG. 1 depicts a physical device, the scope of the system may also encompass a virtual device, virtual machine or simulator embodied in one or more computer programs executing on a computer or computer system and acting or providing a computer system environment compatible with the methods and processes of this disclosure. Where a virtual machine, process, device or otherwise performs substantially similarly to that of a physical computer system, such a virtual platform will also fall within the scope of disclosure provided herein, notwithstanding the description herein of a physical system such as that in FIG. 1.

One or more embodiments are configured to enable the specially programmed computer to take the input data given and transform it into a web-based UI by applying one or more of the methods and/or processes described herein. Thus the methods described herein are able to transform a stored component into a web UI, using the solution disclosed here to result in an output of the system as a web UI design support tool, using the specially programmed computer as described herein.

Figure 2A:
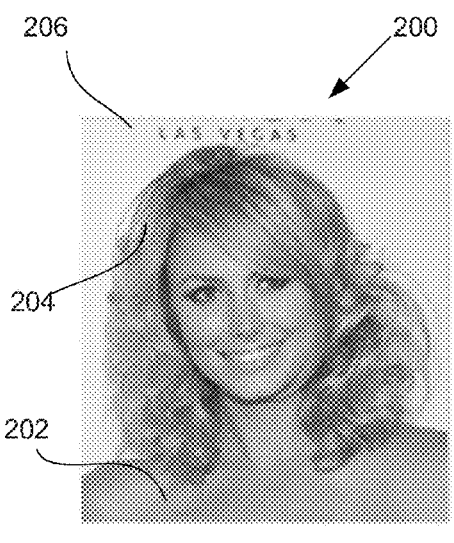
FIG. 2A illustrates an exemplary starting image in accordance with one or more embodiments of systems and methods for digital hair coloring.

FIG. 2A illustrates an exemplary starting image in accordance with one or more embodiments of systems and methods for digital hair coloring. Starting image 200 is an image of a subject on which digital hair coloring will be performed. Starting image 200 includes a hair region 204 of subject 202. Starting image 200 may be a photographic image of subject 202. Starting image 200 further includes background region 206. Background region 206 is the region of starting image 200 excluding hair region 204, including non-hair portions of subject 202. In one or more embodiments, a user interface configured to allow a user to select starting image 200 is provided. The user interface may be further configured to allow the user to select a partial region of an image containing a subject on which to perform the digital hair coloring procedure.

Figure 2B:
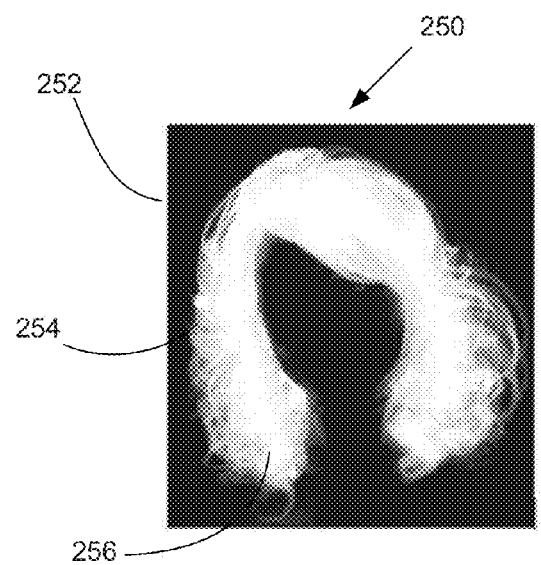
FIG. 2B illustrates a visual representation of an exemplary matte in accordance with one or more embodiments of systems and methods for digital hair coloring.

FIG. 2B illustrates a visual representation of an exemplary matte in accordance with one or more embodiments of systems and methods for digital hair coloring. Matte 250 defines a calculated foreground area 256 of starting image 200. Calculated foreground area 256 corresponds to hair region 204 of starting image 200. Calculated background area 252 corresponds to background region 206 of starting image 200. Matte 250 may further define calculated boundary area 254 corresponding to boundary regions between calculated foreground area 256 and calculated background area 252. In one or more embodiments, calculated boundary area 254 corresponds to boundary pixels between calculated background area 252 and calculated foreground area 256.

Matte 250 may be calculated based on at least one foreground selection which includes a portion of hair region 204 and at least one background selection which excludes hair region 204.

In one or more embodiments, matte 250 is an alpha mask for starting image 200. The alpha mask may comprise alpha values corresponding to each pixel of starting image 200. The alpha mask may be used to extract a foreground image comprising the hair portion of starting image 200. The alpha values may also be used to determine a colored image contribution to said output image and a starting image contribution to said output image. A background alpha value indicates that the corresponding pixel in starting image 200 is a background pixel, while a foreground alpha value indicates that the corresponding pixel in starting image 200 is a foreground pixel. For example, an alpha value of 0 may indicate a background pixel, an alpha value of 1 may indicate a foreground pixel, and an alpha value of between 0 and 1 may indicate the percentage contribution of foreground color to the observed color. At non-boundary pixels, the corresponding alpha value is between the background alpha value and the foreground alpha value. In one or more embodiments, the alpha values are represented as a probability value between 0 and 1. The alpha value may also be represented by an 8-bit color channel with 256 possible alpha values ranging from a background alpha value of 0 to a foreground alpha value of 255.

Methods for generating a matte which identifies a foreground and the background of an image are known in the art. Accordingly, alterations and modifications may be made by a person of ordinary skill in the art without departing from the spirit and scope of the invention. J. Wang and M. F. Cohen, Image and video matting: A survey, *Foundations and Trends in Computer Graphics and Vision,* 3(2), 2007 ("Wang") provides a survey of exemplary matting solutions and techniques, and is hereby incorporated by reference in its entirety to the extent that Wang is relevant to matting techniques compatible with systems and methods described in this disclosure.

Figure 2C:
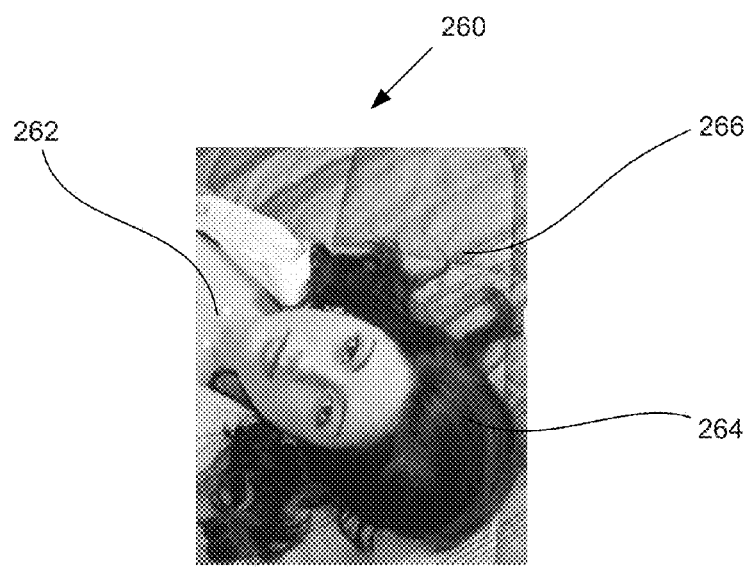
FIG. 2C illustrates an exemplary photographic image of hair representative of the target hair color in accordance with one or more embodiments of systems and methods for digital hair coloring.

FIG. 2C illustrates an exemplary photographic image of hair representative of the target hair color in accordance with one or more embodiments of systems and methods for digital hair coloring. Sample image 260 includes an image of sample subject 262. Sample image 260 further includes at least a portion of sample hair 264, which has a sample hair color. Sample image further includes sample image background 266. A color distribution is extracted from sample image 260 and associated with the sample hair color. In one or more embodiments, the color distribution is represented by n histograms, each histogram corresponding to a color channel in the color space of the starting image. In RGB color space, the color distribution may be represented as three histograms corresponding to the three color channels. However, one of ordinary skill in the art would recognize that the color space of the starting image may be multispectral or hyperspectral without departing from the spirit and the scope of the invention. Furthermore, the starting image may be transformed to a working color space prior to implementation of systems and methods for digital hair coloring.

The color distribution of the sample hair 264 may be extracted using any image processing technique, including any technique for determining a sample foreground region comprising sample hair 264. The color distribution is associated with a hair color. In one or more embodiments, the target hair color may refer to the sample hair color and/or its associated color distribution, obtained by any method described herein.

In one or more embodiments, the target hair color may include a base color, highlights and lowlights. The intensity of one or more of the highlight and lowlights may be modified, such as based on processing of a representative image, a formula for modifying an associated color distribution, or any other method.

Figure 3:
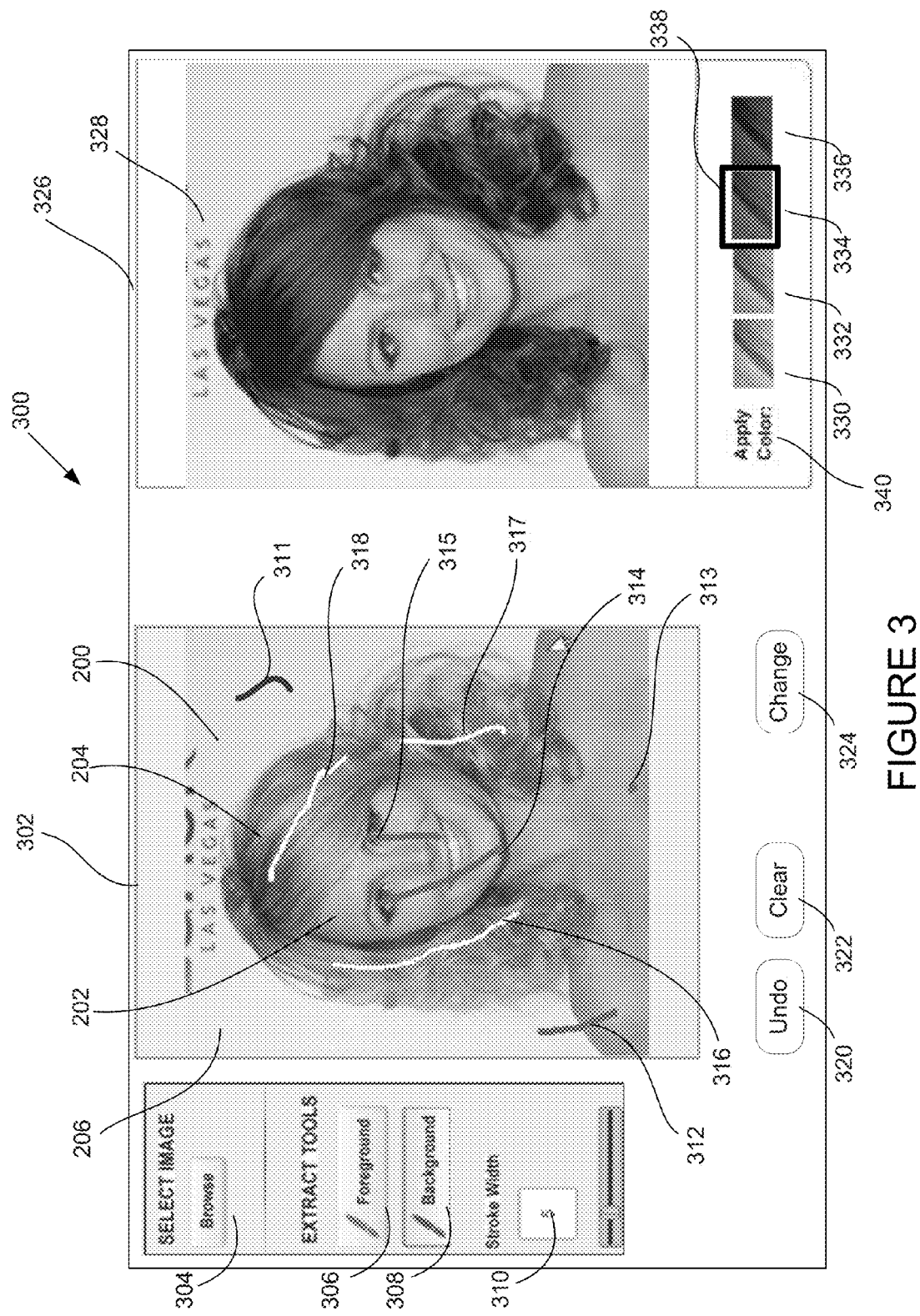
FIG. 3 illustrates an exemplary user interface in accordance with one or more embodiments of systems and methods for digital hair coloring.

FIG. 3 illustrates an exemplary digital hair coloring user interface in accordance with one or more embodiments of systems and methods for digital hair coloring. Digital hair coloring user interface 300 includes starting image display area 302. Starting image display area 302 is configured to display starting image 200. Starting image 200 is an image of a subject on which digital hair coloring will be performed. Starting image 200 includes a hair region 204 of subject 202. For example, starting image 200 may be a photographic image of subject 202, including a hair region 204 of subject 202. Background region 206 is the region of starting image 200 excluding hair region 204 including non-hair portions of the image of subject 202.

Digital hair coloring user interface 300 further includes starting image selection interface 304. Starting image selection interface 304 is configured to provide an interface allowing a user to select starting image 200. Starting image selection interface 304 may be further configured to allow a user to select a partial region of a larger image, where the partial region of the larger image contains an image of the subject on which to perform the digital hair coloring procedure.

Digital hair coloring user interface 300 further includes foreground selection interface 306 and background selection interface 308. Foreground selection interface 306 and background selection interface 308 are configured to allow a user to select at least one foreground selection 316-318 and at least one background selection 311-315. In one or more embodiments, foreground selection interface 306 and background selection interface 308 are configured to allow a user to input foreground and background selections 311-318 directly over starting image display area 202. Foreground and background selection is 311-318 may be displayed over starting image 200. Digital hair coloring user interface 300 may further provide access to one or more functions to facilitate the input of foreground and background selections 311-318 by the user, such as "undo" function 320 and "clear" function 322.

Digital hair coloring user interface 300 may further include selection parameter interface 310. Selection parameter interface 310 is configured to allow a user to modify one or more parameters of foreground selection interface 306 and/or background selection interface 308, such as a brush shape, a stroke width, a starting image zoom, or any other parameter useful to assist a user in selecting at least one background selection 311-315 and at least one foreground selection 316-318.

In one or more embodiments, the user interface is used to create a trimap where every pixel in the image is labeled as Definite Foreground (hair), Definite Background, or Unknown. The user interface may allow the user to draw closed boundary curves to delineate pixels in the foreground and background regions. Pixels that aren't in either region take the unknown label. As described in Cohen, there are many matting algorithms that take an input image and corresponding trimap and output an alpha matte, foreground image and background image.

In one or more embodiments, the at least one foreground selection and at least one background selection are obtained computationally without the use of foreground selection interface 306 or background selection interface 308, such as by image processing algorithms, heuristics, and any other computational method for determining at least one foreground selection and at least one background selection. In one or more embodiments, facial feature recognition techniques are used to determine at least one foreground selection and at least one background selection. One or more embodiments include a boundary selection interface (not shown) configured to allow a user to select at least one boundary selection (not shown) that spans both hair region 204 and background region 206. Subsequent calculations are based on a background portion and a foreground portion determined based on the boundary selection.

In one embodiment of the boundary selection interface, the face and a set of internal facial features such as eyes, iris, mouth, nose, eyebrows, are detected manually or automatically in starting image 200. The detection includes an estimate of the face and each facial feature's location and size. The convex hull of the eyebrows, eyes, and mouth defines a region of the image that is within the face and outside of the hair and may be labeled as background. A skin detector may be applied to the image, and pixels that are detected as skin are labeled as background. The skin detector may use the locations of facial features to build a model of the color distribution of skin.

Figure 5:
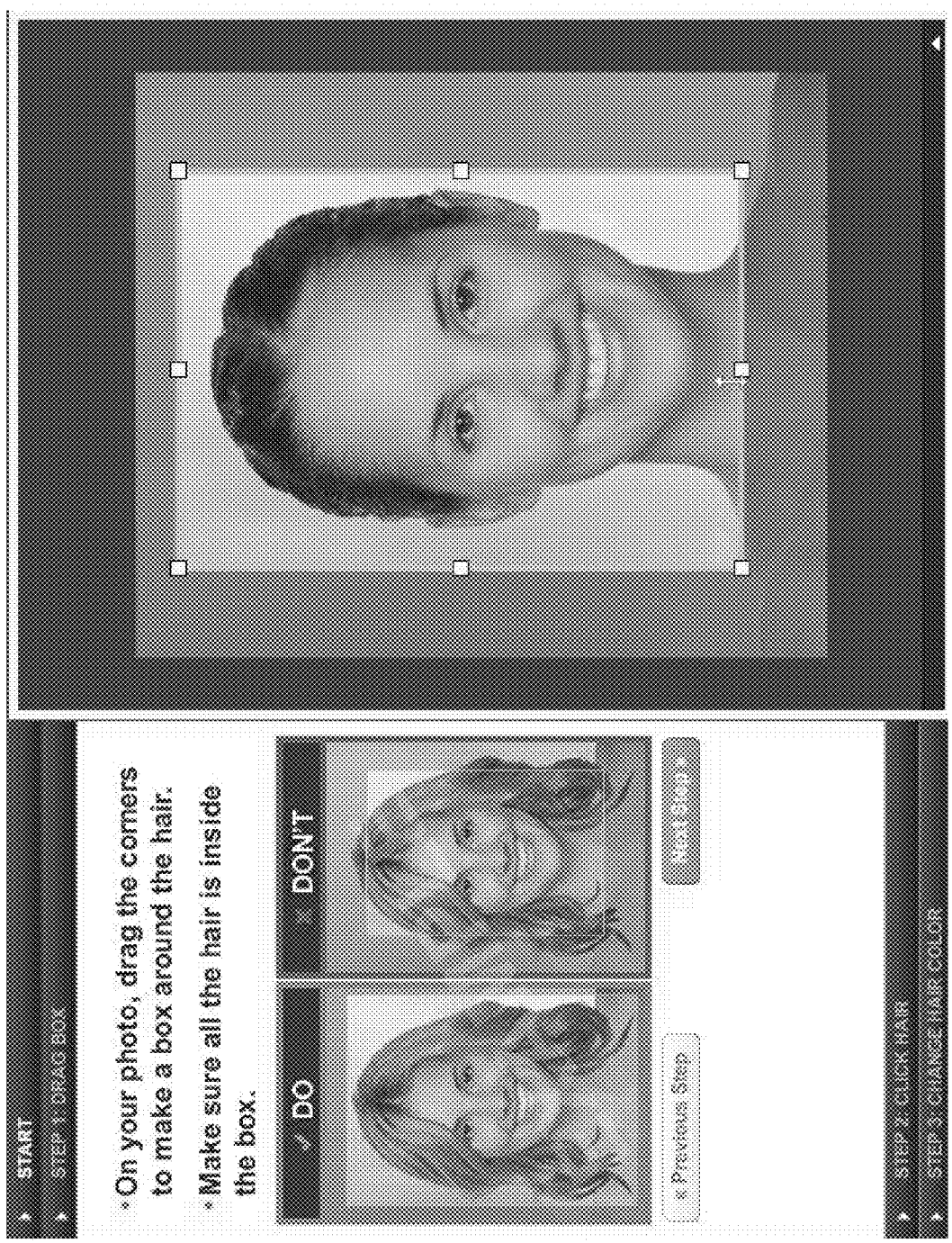
FIGS. 5-10 illustrate exemplary user interfaces in accordance with one or more embodiments of systems and methods for digital hair coloring.

In one or more embodiments, the matte is calculated based on a bounding box, a skin region, and one or more foreground points. A bounding box around said hair region of said starting image is obtained. A bounding box may be placed around the hair, and all pixels outside of the box are labeled as background, where the hair region is entirely within the box. The bounding box may be placed manually by the user, or automatically placed using the detected location of the face or facial features. A graphical user interface may allow a user to adjust the size and position of the bounding box. FIG. 5 illustrates an exemplary user interface for adjusting the size and position of a bounding box in accordance with one or more embodiments of systems and methods for digital hair coloring.

The skin region of said starting image is detected, such as by using one or more algorithms, heuristics, or other image processing methods.

Figure 6:
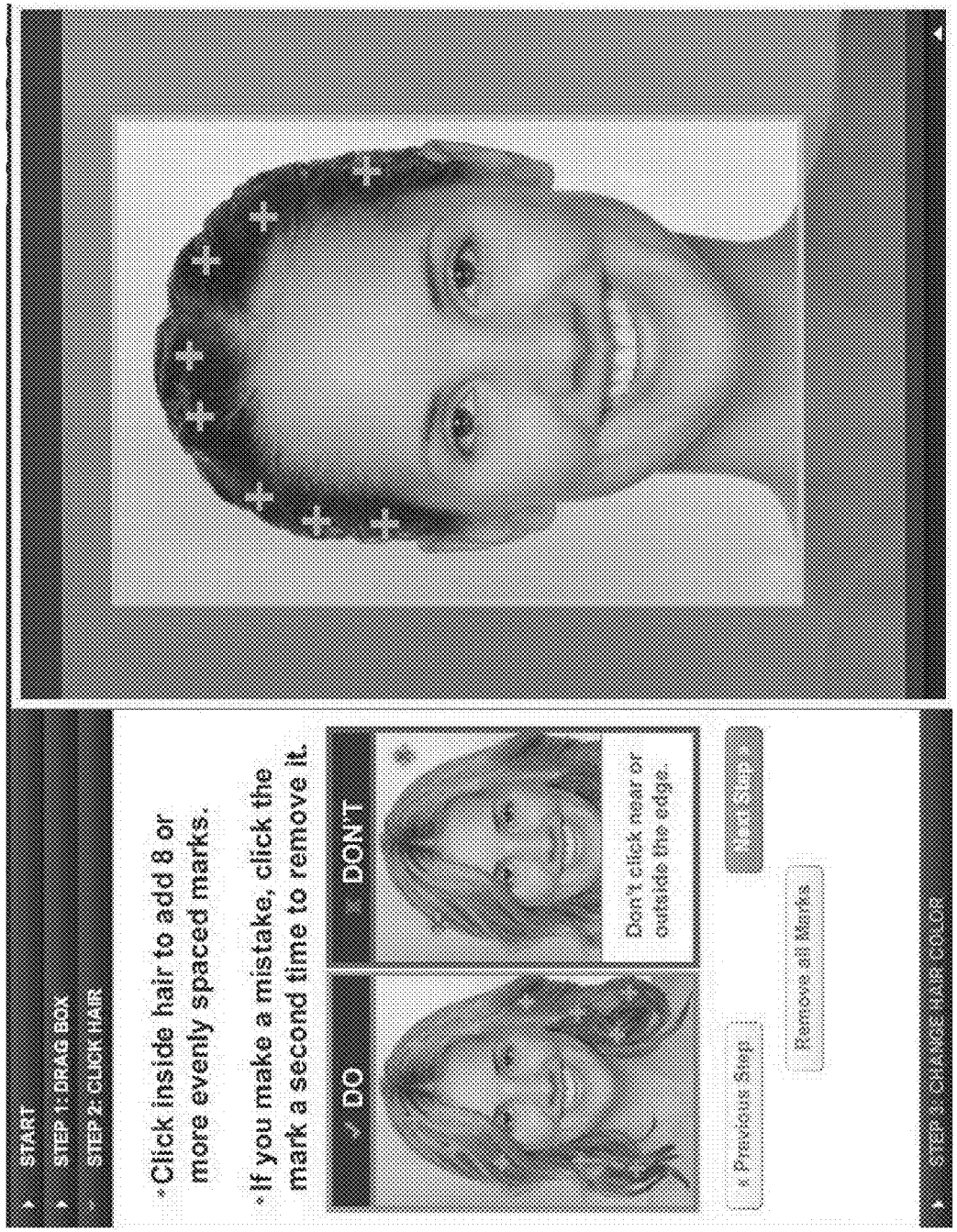

One or more foreground points within said hair region of said starting image are obtained. FIG. 6 illustrates an exemplary user interface for inputting one or more foreground points in accordance with one or more embodiments of systems and methods for digital hair coloring.

Figure 7:
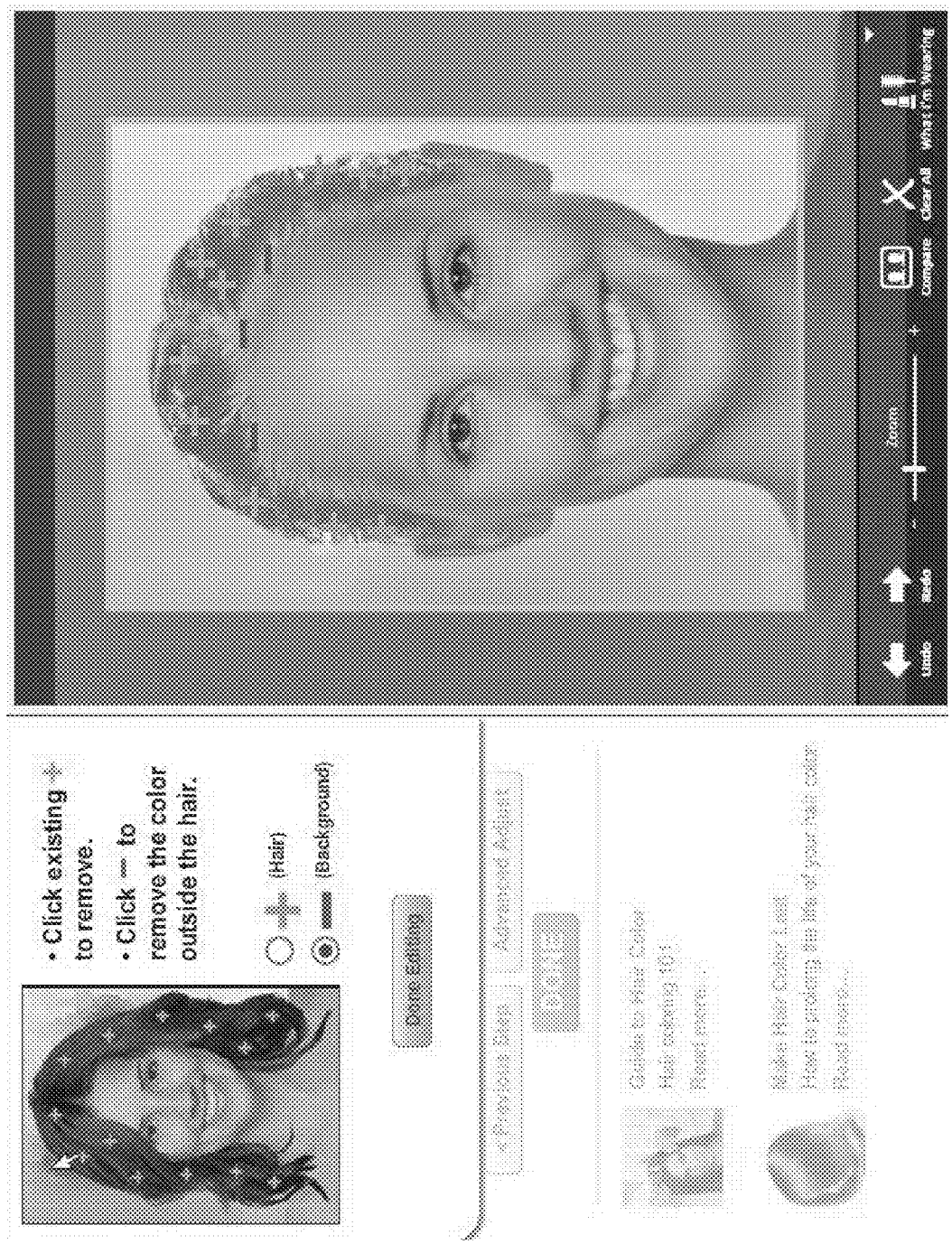

The foreground points may be adjusted, such as by the user after viewing a hair coloring result based on the selected foreground points. In one or more embodiments, one or more background points of the starting image are obtained, where the background points are outside of the hair region of the starting image. In one or more embodiments, a user interface is provided for further refining the one or more foreground points. FIG. 7 illustrates an exemplary user interface for inputting one or more background points and for modifying one or more foreground points in accordance with one or more embodiments of systems and methods for digital hair coloring. Digital hair color user interface 300 further includes hair color selection interface 340. Hair color selection interface 340 is configured to allow a user to select target hair color 338. For example, hair color selection interface 340 may be configured to display a selection of available hair colors 330-336 from which the user may select target hair color 338. Each available hair color 330-336 is associated with a color distribution.

In one or more embodiments, the color distribution associated with each hair color 330-336 is extracted from at least one photographic image of hair representative of the hair color. Digital hair color user interface 300 may be configured to allow a user to select target hair color 338 from a predefined set of available hair colors 330-336. In one or more embodiments, digital hair color user interface 300 is configured to allow a user to select a photographic image of hair representative of a desired color. The photographic image may be selected from a predefined set of photographic images each having a corresponding target hair color and target color distribution.

When a hair coloring product is applied to a person's hair, the resulting color depends upon the starting color as well as other characteristics of that person's hair. In one or more embodiments, the target color distribution is further based on at least one hair characteristic selected from a starting hair color, a hair grayness, a hair damage level, a hair texture, a hair thickness, an ethnicity hair type, and any other characteristic describing a person's hair. To simulate the effect of applying a hair coloring product, the person's initial hair color can be determined from the image and the target color for that product when applied to the initial color is stored in a database. One or more hair characteristics may also be input or otherwise selected by a user through a user interface. Alternatively the target color can be computed using an analytical model or a statistical model. The hair in the original image is then recolored to be the target hair color.

Digital hair color user interface 300 may also be configured to allow the user to select and submit any photographic image, where a customized target color distribution is extracted from the photographic image and used to generate output image 328. The customized target color distribution is calculated from the photographic image submitted by the user. Digital hair color user interface 300 may further provide a customized hair color generation interface (not shown) to obtain any information useful for generating the customized target color distribution. This information includes at least one of background selections, foreground selections, boundary selections, and any other information useful for generating the customized target color distribution. The color distribution may be extracted using any image processing technique, including any technique for determining a sample foreground region comprising the target hair.

Figure 8:
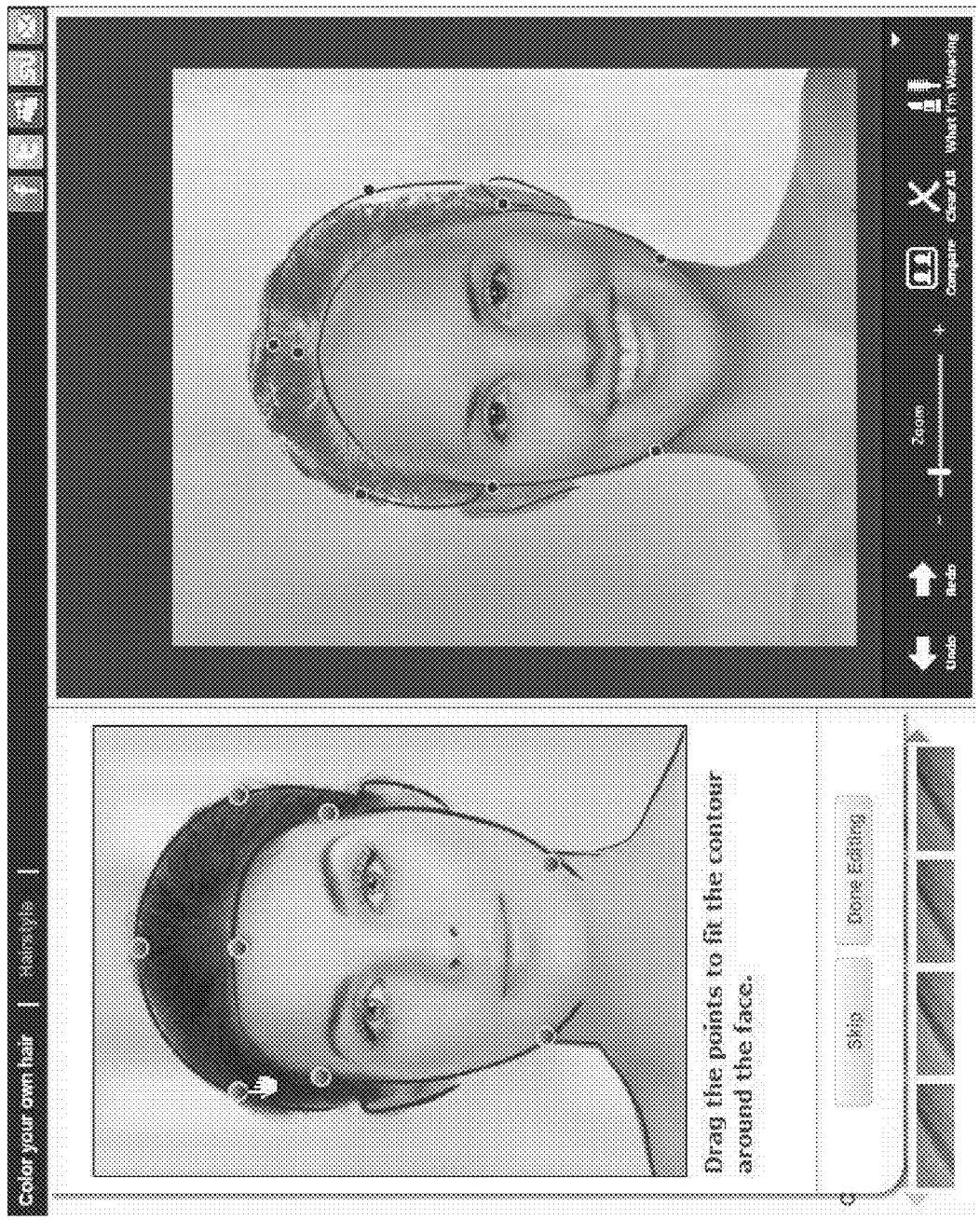
Figure 9:
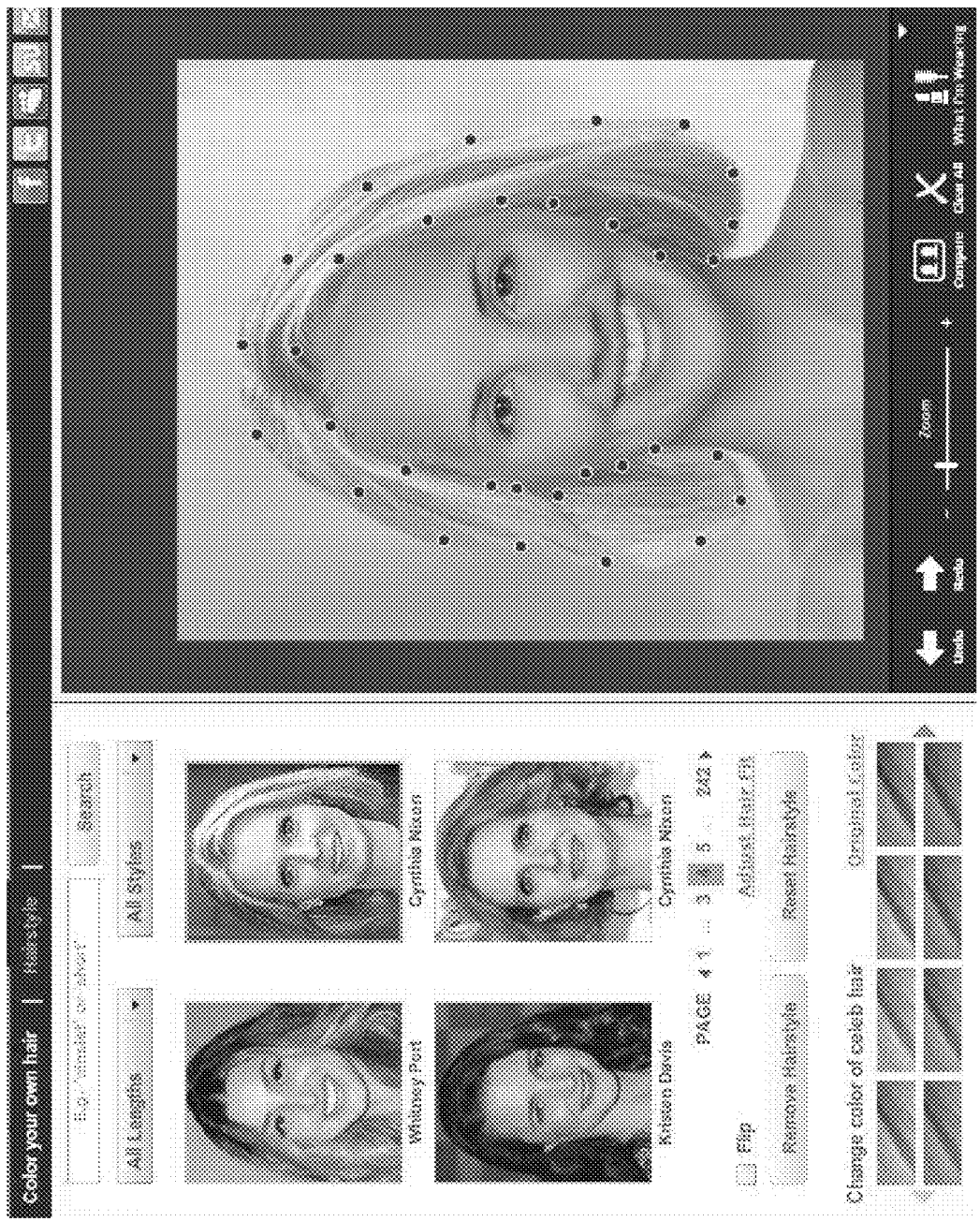
Figure 10:
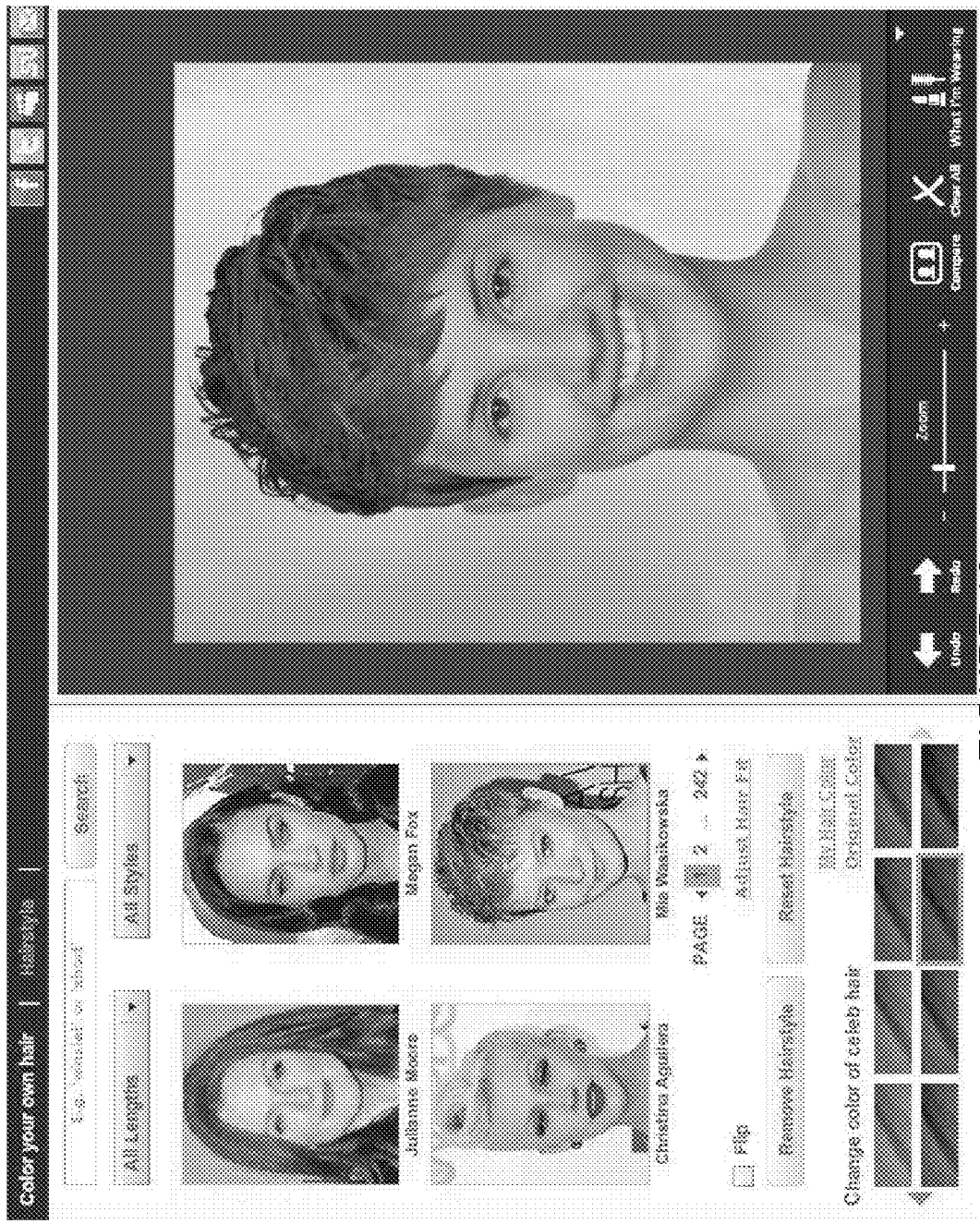

Digital hair color user interface 300 may also be configured to allow the user to select and submit a photographic image of a face, and a customized target color distribution may be extracted from the photographic image. An extracted hairstyle which is represented as a color image and an alpha mask can be recolored to the target color distribution using the methods of the present invention. The recolored extracted hairstyle can be fit and overlaid onto the user's photographic image using the methods of U.S. patent application Ser. No. 12/406,099, entitled SYSTEM AND METHOD FOR CREATING AND SHARING PERSONALIZED VIRTUAL MAKEOVERS, filed, Mar. 19, 2009, which is hereby incorporated in its entirety. FIGS. 8-10 illustrate exemplary user interfaces for custom digital hair styling in accordance with one or more embodiments of systems and methods for digital hair coloring.

In one or more embodiments, a photographic image of a subject including a hair region is obtained. In one or more embodiments, the starting image may be transformed to a working color space before applying systems and methods for digital hair coloring. A hairstyle image including a color image and an alpha mask is obtained. The hairstyle image may be generated using any of the methods described herein. In one or more embodiments, a selection of pre-generated hairstyles are provided to a user. A custom target color distribution from the photographic image is obtained. In one or more embodiments, the selected target color distribution is extracted based on at least the hair region of the photographic image, such as by using any of the methods described herein. A color transformation based on the selected target color distribution is applied to the hairstyle image, such as by using any of the methods described herein. In one or more embodiments, the color transformation is applied to at least one color channel of a plurality of color channels of a color space of the starting image. In one or more embodiments, the color transformation is applied to a subset of the color channels of a color space of the starting image or a working color space that the starting image is transformed to prior to applying systems and methods for digital hair coloring. For example, in one or more embodiments where a color space of a starting image separates chrominance (color, i.e., the UV channels) from Luminance (brightness, i.e., the Y channel), such as YUV, the transformation may be applied to only the UV channel and not the Y channel. The hairstyle image is fitted to a head of the subject in the starting image. An output image including the starting image and the hairstyle image is generated based on the alpha mask, such as by using any of the methods described herein. Digital hair coloring user interface 300 is further configured to allow a user to initiate the digital hair coloring process on starting image 200 based on foreground and background selections 311-318. In one or more embodiments, execution interface 324 is provided to allow a user to initiate the digital hair coloring process. Execution interface 324 may allow a user to initiate the digital hair coloring process after any change made through digital hair color user interface 300, such as changes to background selections 311-315, foreground selections 316-318, selection parameters, starting image 200, and target hair color 338.

Digital hair coloring user interface 300 further includes output image display area 326. Output image display area 326 is configured to display output image 328. Output image 328 shows the result of the digital hair coloring procedure performed on starting image 200 to digitally color a hair region 204 of subject 202 based on target hair color 338. The color distribution associated with target hair color 338 is used to generate output image 328.

Figure 4:
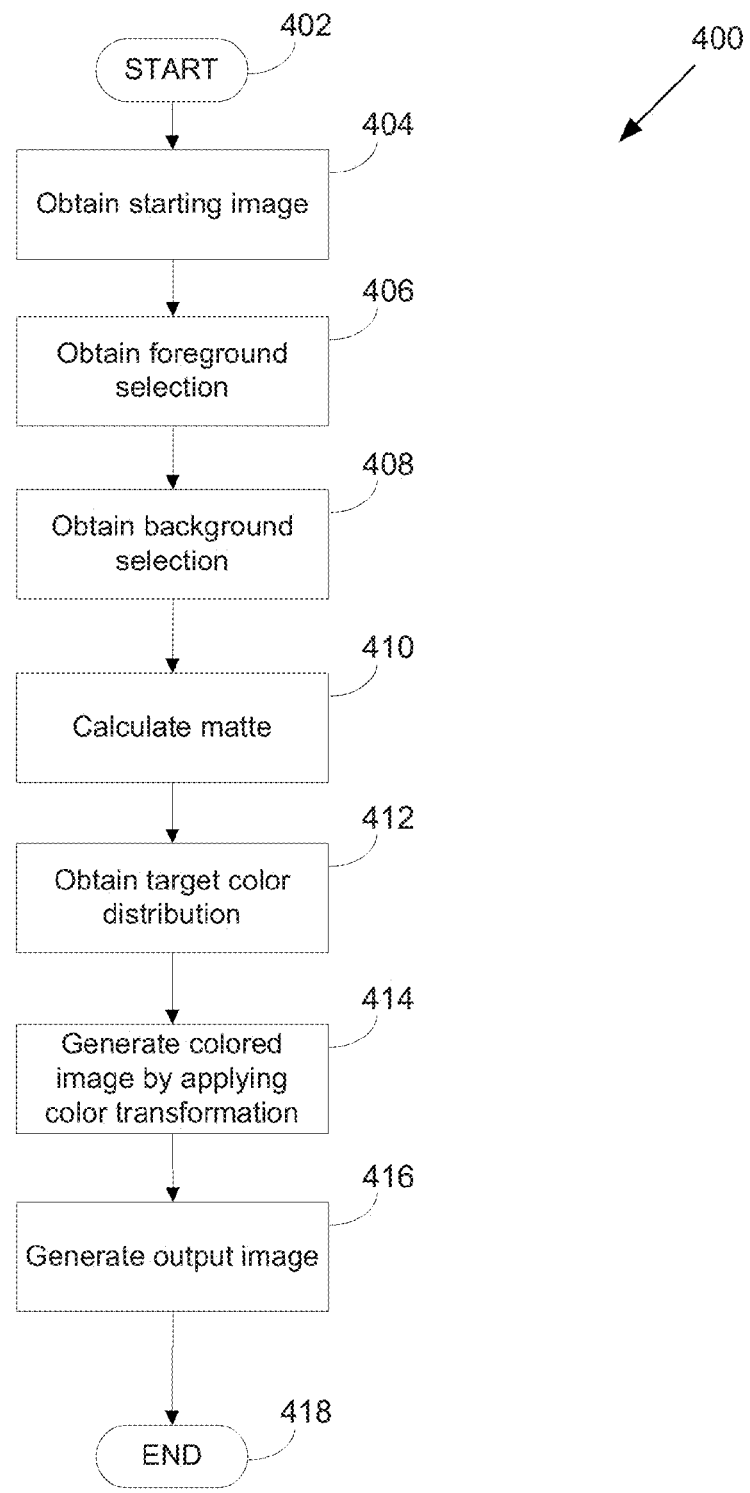
FIG. 4 is a flowchart showing exemplary process steps in accordance with systems and methods for digital hair coloring.

FIG. 4 is a flowchart showing exemplary process steps in accordance with systems and methods for digital hair coloring. Process 400 begins at step 402. Processing continues to step 404, where a starting image of a subject is obtained. The starting image includes a hair region of the subject. The starting image may be obtained by providing a user interface allowing a user to select a starting image.

Processing continues to step 406, where at least one foreground selection is obtained. The at least one foreground selection includes a portion of the hair region of the subject. The at least one foreground selection may be obtained by providing a user interface allowing a user to select at least one foreground selection. The at least one foreground selection may also be computed using image processing algorithms, heuristics, or any other computational method.

Processing continues to step 408, where at least one background selection is obtained. The at least one background selection excludes the hair region of the subject. The at least one background selection may be obtained by providing a user interface allowing a user to select at least one background selection. The at least one foreground selection may also be computed using image processing algorithms, heuristics, or any other computational method.

Processing continues to step 410, where a matte is calculated. The matte defines a calculated foreground area of the starting image. In one or more embodiments, the matte is calculated based on the foreground selection and the background selection. The matte may also be calculated based on a boundary selection. The matte identifies a calculated foreground area and a calculated background area of the starting image. The matte may also specify a calculated boundary area. The calculated boundary area may correspond to boundary pixels between the calculated background area and the calculated foreground area. The calculated boundary area, the calculated foreground area, and the calculated background area may each comprise one or more contiguous or noncontiguous portions of the starting image.

In one or more embodiments, the matte is an alpha mask composed of alpha values corresponding to each pixel of the starting image. A background alpha value indicates that the corresponding pixel in the starting image is a background pixel, while a foreground alpha value indicates that the corresponding pixel in the starting image is a foreground pixel. For example, an alpha value of 0 may indicate a background pixel, an alpha value of 1 may indicate a foreground pixel, and an alpha value of between 0 and 1 indicate the percentage contribution of foreground color to the observed color.

Because of the thin structure of each hair strand, the boundary of the hair region of the starting image is poorly defined. A wisp of hair may be narrower than the width or height of a pixel, and so the color of a pixel on the boundary may be a combination of the color of the hair and the background. The image may also be out of focus and so at the boundary, pixels may become a weighted average of the foreground and background colors in the neighborhood of the boundary point. For example, the background color may vary along the boundary of the hair region, and at places may be very close to the same color as adjacent pixels within the hair region. As a result, the color of a "boundary" pixel is considered an additive mixture of color contributions from a hair strand and from the background in one or more embodiments. At boundary pixels, the corresponding alpha value is between the background alpha value and the foreground alpha value (e.g. between 0 and 1). The alpha value may be represented by an 8-bit color channel with 256 possible alpha values ranging from a background alpha value of 0 and a foreground alpha value of 255. The alpha mask may be used to extract a foreground image comprising the hair portion. The alpha values may also be used to determine a colored image contribution to said output image and a starting image contribution to said output image.

In one or more embodiments, the color of the a pixel in a boundary area, such as the calculated boundary area, is defined as: $C=\alpha H+(1-\alpha)B$, where $C$=Observed color of the boundary pixel
$H$=Color of hair at the boundary pixel
$B$=Color of background at the boundary pixel
$\alpha$=Contribution of H to the image at the boundary pixel ($\alpha$ is in the range $[0,1]$)

Processing continues to step 412, where the target color distribution is obtained. In one or more embodiments, the target color distribution is based on a target hair color. The target hair color may be obtained by providing a user interface allowing a user to select a target hair color. The target hair color may be selected from a selection of available hair colors, each corresponding to a calculated color distribution. In one or more embodiments, calculated color distributions are extracted from at least one photographic image of hair representative of a specific hair color.

In one or more embodiments, the target color distribution is obtained by allowing a user to submit any photographic image, where a customized target color distribution is extracted from the photographic image. The customized target color distribution may be extracted from the photographic image using one or more image processing algorithms, heuristics, or any other computational method, including computational methods which require additional user input, such as partial foreground selection information and partial background selection information.

In one or more embodiments, at least one color distribution is calculated by randomly sampling color values of hair pixels from a region identified as hair, and estimating the color distribution using the sample colors. In one or more embodiments, the color distribution is represented by n histograms, each histogram corresponding to a color channel in the color space of the starting image. In RGB color space, the color distribution may be represented as three histograms corresponding to the three color channels.

In one or more embodiments, second order statistics of the probability distribution (e.g. the mean vector and covariance matrix of the distribution) is used to model the color distribution. The distribution is thus described as an ellipsoidal volume in the corresponding color space, even though the actual distribution can have any shape. The principal axes of the color distribution can be estimated using principal component analysis (PCA). In one or more embodiments, robust PCA or robust singular value decomposition may be used. Robust PCA is described in, Robust principal component analysis for computer vision, De la Torre, F. and Black, M. J., *Int. Conf on Computer Vision, ICCV*-2001, Vancouver, BC, Vol. I, pp. 362-369, which is herein incorporated by reference in its entirety.

In one or more embodiments, the target color distribution is a distribution in an ellipsoidal volume of a three-dimensional color space. Target principal ellipsoid axes of the target color distribution corresponding to the ellipsoidal volume may be estimated using principal component analysis. Generating the output image based on a color distribution as described may include transforming starting principal axes of color distribution of the starting image to the target principal ellipsoid axes of the target color distribution, such as by using an affine transformation. For example, the affine transformation may be rotation, scaling and translation of colors.

Processing continues to step 414, where a colored image is generated by applying a color transformation. The color transformation is based on the target color distribution. The color transformation is applied to at least the calculated foreground area of the starting image. In one or more embodiments, the color transformation is only applied to a calculated foreground area of the starting image, as indicated by the matte. The color transformation may also be applied to substantially all of the starting image.

When a hair coloring product is applied to person's hair, the resulting color depends upon the starting color as well as other characteristics of that person's hair. In one or more embodiments, the target color distribution is further based on at least one hair characteristic selected from a starting hair color, a hair grayness, a hair damage level, a hair texture, a hair thickness, an ethnicity hair type, and any other characteristic describing a person's hair. To simulate the effect of applying a hair coloring product, the person's initial hair color can be determined from the image and the target color for that product when applied to the initial color is stored in a database. One or more hair characteristics may also be input or otherwise selected by a user through a user interface. Alternatively the target color can be computed using an analytical model or a statistical model. The hair in the original image is then recolored to be the target hair color.

In one or more embodiments, the target color distribution includes three histograms corresponding to three color channels of a selected color space, such as RGB, CIE Lab, HSV and HSI, or any other color space. The target color distribution may also include n histograms corresponding to n channels of a selected color space. When the target color distribution is based on histograms corresponding to color channels, a nonlinear color transform may be used to map a starting color distribution of the starting image to the target color distribution, where the color transformation is independent of pixel location. In one or more embodiments, the nonlinear color transform is histogram matching. For example, where the starting image is described in a three-channel color space, each of the starting three color histograms computed from the pixels in the hair region of the starting image are each independently transformed to the three color histograms of the target color distribution. Histogram matching may be applied to one or more color channels. The starting three color histogram may be estimated using random sampling of hair pixels from the hair region.

One of ordinary skill in the art would recognize that any method for computing the histogram or equivalent of a color channel as used by a histogram matching algorithm may be used without departing from the spirit or scope of the invention. In one or more embodiments, for a pixel (u,v) where alpha (u,v) is greater than some threshold, casts one vote in the appropriate histogram bin. When the threshold is set to zero, then any pixel that is within the hair region, including boundary pixels, will cast a vote. In one or more embodiments, a pixel (u,v) casts a vote that is weighted by its alpha value, such that boundary pixels carry less weight than pixels deeper within the hair region.

In one or more embodiments, the second order statistics of the target color distribution of a selected color space are computed. Target principal axes of the target color distribution may be estimated using principal component analysis.

Generating the output image based on a color distribution as described may include transforming starting principal axes of the color distribution of the starting image to the target principal axes of the target color distribution, such as by using an affine transformation. For example, the affine transformation may be rotation, scaling and translation of colors.

In one embodiment of the invention, a set of n sample colors from the starting image is available. The mean vector of the starting colors is computed and denoted as ms. An n by 3 matrix Ds is formed by subtracting ms from the starting colors, and thin singular value decomposition (SVD) is performed on Ds yielding three matrices Us, Ss, and Vs where Ds=Us*Ss*Vs' and ' denotes matrix transpose, Ss is a diagonal matrix with nonnegative entries, and Vs is an orthogonal matrix. Another set of m sample colors from the target image is available. The mean vector of the target colors is computed and denoted as mt. An m by 3 matrix Dt is formed by subtracting mt from the target colors, and thin singular value decomposition (SVD) is performed on Dt yielding three matrices Ut, St and Vt where Dt=Ut*St*Vt', "*" denotes matrix multiply, and "'" denotes matrix transpose. St is a diagonal matrix with nonnegative entries, and Vt is an orthogonal matrix. Representing a color in the starting image as three-vector cs, a transformation from cs to the target color ct is:

$$ct=Vt*St*Ss^{-1}*Vs'*(cs-ms)+mt$$

where $Ss^{-1}$ is the inverse of Ss. This transformation is an affine transformation.

In one embodiment of the invention, the set of sample colors from the starting image are transformed according to $$bs=Ss^{-1}*Vs'*(cs-ms)$$

and all of the sample target colors are transformed as $$bt=St^{-1}*Vt'*(ct-mt)$$

These two transformations are whitening transformations. A nonlinear mapping from transformed source colors bs to transformed target colors can be established with histogram matching on at least one of the color channels of the transformed sample colors bs and bt. Denoting this mapping as H, colors from the starting image may then be transformed by the nonlinear transformation:

$$Vt*St*H(Ss^{-1}*Vs'*(cs-ms))+mt$$

The mapping H may be stored as three look up tables.

Processing continues to step 416, where an output image is generated. The output image is generated using both the colored image and the starting image. If the color transformation of step 414 is applied to the entire starting image, generating the output image comprises determining a color contribution of the colored image to the output image at each pixel of the colored image. In one or more embodiments, alpha values from an alpha mask are used to generate the output image, where each alpha value determines a colored image contribution to the output image at the corresponding pixel.

In one or more embodiments, the following equation is applied pixel-wise to produce the output image:

$$O=\alpha T(F)+(1-\alpha)S, \text{ where}$$

T=color transformation
F=extracted foreground image of the hair
O=output image
S=Background image In one or more embodiments, the color transform is applied to the starting image and F is taken to be the entire starting image I. In one or more embodiments, the background image S is taken to be the starting image. In one or more embodiments, both the foreground and background images are taken to be the starting image. and so the output image is described by the following equation:

$$O = \alpha T(I) + (1-\alpha)I.$$

In one or more embodiments, the target hair color corresponds to a hair color product. The alpha image may represent a simulation of the hair color product on the subject. At least one characteristic capable of affecting the result of the hair color product may be obtained, such as the hair texture, an ethnicity, a starting hair color, or any other characteristic of the subject capable of affecting the result of actually applying the hair color product to the subject. At least one of the color transformation of step 414 and the target color distribution may be modified based on the at least one characteristic to more accurately simulate the application of the hair color product to the subject pictured in the starting image.

In one or more embodiments, at least one of the starting image and the target hair color image (i.e. an image associated with the target hair color) is decomposed. The starting image and the target hair color image may be decomposed into regions. The starting image and the target hair color image may also be decomposed based on filters. In one or more embodiments, the target hair color image is decomposed to reflect a spatial dependence in the target hair color image. For example, a color component (including an overall color, a base color, highlights, lowlights, and any other color) might be lighter, darker, or otherwise different in a different portion of the hair (e.g. the top or the bottom). A decomposition can offer more realistic coloring that preserves these features. Exemplary decomposition processes are described in Example 1 and Example 2. One of ordinary skill in the art would appreciate that any method of image decomposition may be used to achieve an effect in systems and methods for digital hair coloring.

Example 1

Decomposing Starting Image and Target Hair Color Image into Regions

The starting image and a target hair color image can be decomposed into multiple images or patches, such that one or more described embodiments may be applied to each of the elements of the decomposition before recomposing the image. Two classes of decompositions are a spatial decomposition and a frequency decomposition.

In a spatial decomposition, both the starting image and an image associated with the target hair color, along with their corresponding alpha masks, are decomposed into regions, or patches, in a consistent fashion such that there is a correspondence between each patch in the starting image and a patch in the target image. For example, the images can be decomposed into the top, middle, and bottom thirds. The patches in the same image do not need to be the same size or shape, and corresponding regions between images may be of different size or shape. Patches may overlap each other. A patch can be one or more simply or multiply connected regions of the image.

Along with the decomposition, there must be a method for recomposing the hair region of the input image and alpha mask from the decomposition. That is, there must be a way to recreate the hair in the input image from the patches. When the regions are non-overlapping, this may be done by copying each patch's content to a reconstruction. When the patches overlap, then the recomposition process must blend the patches. One way to recompose the hair region of the input image from overlapping patches is to first create a collection of alpha masks during the decomposition with one alpha mask per patch, and then alpha blend the patches using the collection of alpha masks.

Let (u,v) denote the coordinates of a pixel in an image, and let I denote the input image where I(u,v) is the color of the pixel at (u,v). Let alpha(u,v) denote the value of the alpha mask for the hair region of the input image. A decomposition creates n patches $R_i(u,v)$ where i ranges from 1 to n. For overlapping patches, the corresponding alpha mask is denoted $alpha_i(u,v)$. The recomposition is then created as:

$$R(u,v) = \sum_{i=1}^{n} \text{alpha}_i(u,v) R_i(u,v).$$

For non-overlapping patches, $alpha_i(u,v)$ only takes on values of 0 or 1. Depending upon the shape of the patches, more efficient methods will produce an equivalent recomposition than taking the summation in the above equation. One or ordinary skill in the art would appreciate that any method capable of producing an equivalent recomposition may be used without departing from the spirit or the scope of the invention.

Along with the decomposition into n patches, there are n color distributions for the target hair color. These color distributions may be determined by decomposing an image of a hairstyle with the target hair into n regions, or they could be obtained through some other means. The color distributions need not be distinct. From the color distribution in patch $R_i(u,v)$ and a target distribution, a color transformation $T_i(c)$ that takes as input a source color c and produces a target color. The recolored hairstyle image O1(u,v) is then created using the n color transforms and recomposition according to $$O1(u,v) = \sum_{i=1}^{n} \text{alpha}_i(u,v) T_i(R_i(u,v)).$$

can then be alpha blended with the input image using alpha (u,v) to create the recolored image.

Example 2

Decomposing the Starting Image and the Target Hair Image Color Using Filters

Rather than decomposing the input image I(u,v) spatially into patches, the image can be decomposed by applying a set of n filters to the image to produce n filtered images $F_i(u,v)$ where i ranges from 1 to n such that the image can be recomposed from the filter outputs. The recomposition process takes n images as input and produces a recomposed image. One decomposition technique is to apply a set of orthogonal linear filters to the input image I(u,v) and then recomposition R'(u,v) is accomplished by summing the filtered images:

$$R'(u,v) \sum_{i=1}^{n} F_i(u,v)$$

The filters might decompose the image based on spatial frequency. Along with the decomposition into n filtered images, there are n color distributions for the target hair color.

These color distributions may be determined from filtering an image of a hairstyle with the target hair color to produce n filtered images. The color distributions need not be distinct. From the color distribution in the filtered image $F_i(u,v)$ and a target distribution, a color transformation $T'_i(c)$ is created that takes as input a source color c and produces a target color. $T'_i(c)$ is created using the methods described elsewhere in this patent application with techniques such as principal component analysis and histogram matching. The recolored hairstyle image is then created using the n color transforms and recomposition according to:

$$O2(u, v) = \sum_{i=1}^{n} T'_i(F_i(u, v)).$$

can then be alpha blended with the input image I(u,v) using alpha(u,v) to create the recolored image.

It will be recognized that for both decomposition methods described above, the decomposition of the image with the target hair color is only used to obtain the distribution of colors in each patch (respectively filtered image). If these distributions are available from other means or sources, then it is unnecessary to use an image with a target color.

While the invention herein disclosed has been described by means of specific embodiments and applications thereof, numerous modifications and variations could be made thereto by those skilled in the art without departing from the scope of the invention set forth in the claims.

What is claimed is:

1. A computer-implemented method for digital hair coloring comprising:
    obtaining a starting image I of a subject including a hair region;
    calculating a matte defining a calculated foreground area of said starting image, wherein said calculated foreground area comprises said hair region, wherein said matte comprises an alpha mask α composed of alpha values corresponding to each pixel of the starting image;
    obtaining a target color distribution of a target hair color in an ellipsoidal volume of a three-dimensional color space;
    generating a recolored image T(I) by using nonlinear color transformation to map a starting color distribution of the calculated foreground area of the starting image to the target color distribution; and
    generating an output image O from alpha blending of said recolored image with said starting image resulting in changing of color of said hair region, wherein said output image is generated from an equation comprising $O=\alpha T(I)+(1-\alpha)I.$ 2. The computer-implemented method of claim 1, further comprising:
    obtaining at least one foreground selection of said starting image comprising a portion of said hair region; and
    obtaining at least one background selection of said starting image excluding said hair region, wherein said matte is calculated based on said foreground selection and said background selection.

3. The computer-implemented method of claim 2, wherein said at least one foreground selection and said at least one background selection are obtained by image processing.

4. The computer-implemented method of claim 1, further comprising:
    obtaining a bounding box around said hair region of said starting image;
    detecting a skin region on said starting image;
    obtaining one or more foreground points within said hair region of said starting image;
    wherein said matte is calculated based on said bounding box, said skin region, and said one or more foreground points.

5. The computer-implemented method of claim 1, wherein:
    said calculating said matte comprises calculating an alpha mask for said starting image comprising alpha values in a range from a background alpha value to a foreground alpha value, wherein said background alpha value indicates a background pixel, said foreground alpha value indicates a foreground pixel, and an alpha value between said background alpha value and said foreground alpha value indicates a proportion of foreground color and background color of a pixel; and
    said generating said output image comprises using said alpha values to determine said recolored image contribution to said output image and said starting image contribution to said output image.

6. The computer-implemented method of claim 1, wherein said target color distribution comprises three histograms corresponding to three color channels of a selected color space.

7. The computer-implemented method of claim 6, wherein said selected color space is selected from a group consisting of RGB, CIE Lab, HSV, YIQ, YUV, YCbCr, CMYK, CIE XYZ, and HSI.

8. The computer-implemented method of claim 1, wherein said color transformation is independent of pixel location.

9. The computer-implemented method of claim 8, wherein said nonlinear transformation is histogram matching applied to one or more color channels.

10. The computer-implemented method of claim 1, wherein said target color distribution is extracted from a photographic image of hair representative of said target hair color.

11. The computer-implemented method of claim 1, further comprising recommending a hair color product associated with said target hair color, wherein said output image comprises a simulation of a result of applying said hair color product to said subject.

12. The computer-implemented method of claim 11, further comprising:
    obtaining at least one characteristic of said subject capable of affecting said result of applying said hair color product; and
    modifying at least one of said target color distribution and said color transformation based on said at least one characteristic.

13. The computer-implemented method of claim 1, wherein said target color distribution is further based on at least one hair characteristic selected from a starting hair color, a hair grayness, a hair damage level, a hair texture, a hair thickness, and an ethnicity hair type.

14. A non-transitory computer-readable medium comprising computer-readable instructions for digital hair coloring, wherein execution of said computer-readable instructions by one or more processors causes said one or more processors to:
    obtain a starting image of a subject including a hair region;
    calculate a matte defining a calculated foreground area of said starting image, wherein said calculated foreground area comprises said hair region, wherein said matte comprises an alpha mask composed of alpha values corresponding to each pixel of the starting image;

obtain a target color distribution of a target hair color in an ellipsoidal volume of a three-dimensional color space;

generate a recolored image by using nonlinear color transformation to map a starting color distribution of the matte to the target color distribution; and generate an output image from alpha blending of said recolored image with said starting image resulting in changing of color of said hair region.

15. A system for digitally coloring hair on an image comprising:

computer memory comprising a stored set of instructions for digital hair coloring; and at least one microprocessor configured to process a starting image and digitally coloring hair on said starting image according to the stored set of instructions, the stored set of instructions configured to:

obtain said starting image of a subject including a hair region;

calculate a matte defining a calculated foreground area of said starting image, wherein said calculated foreground area comprises said hair region, wherein said matte comprises an alpha mask composed of alpha values corresponding to each pixel of the starting image;

obtain a target color distribution of a target hair color in an ellipsoidal volume of a three-dimensional color space;

generate a recolored image by using nonlinear color transformation to map a starting color distribution of the matte to the target color distribution; and generate an output image from alpha blending of said recolored image with said starting image resulting in changing of color of said hair region.

* * * * *